United States Patent
Gupta et al.

(10) Patent No.: US 11,039,420 B2
(45) Date of Patent: Jun. 15, 2021

(54) TECHNIQUES FOR SELECTING RSMA SPREADING CODE FOR PERIODIC TRAFFIC IN INTERNET-OF-EVERYTHING DEVICES

(71) Applicant: QUALCOMM Incorporated, San Diego, CA (US)

(72) Inventors: Piyush Gupta, Bridgewater, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/419,784

(22) Filed: May 22, 2019

(65) Prior Publication Data

US 2019/0373582 A1 Dec. 5, 2019

Related U.S. Application Data

(60) Provisional application No. 62/679,592, filed on Jun. 1, 2018.

(51) Int. Cl.
*H04W 72/00* (2009.01)
*H04L 5/00* (2006.01)
(Continued)

(52) U.S. Cl.
CPC ......... *H04W 72/005* (2013.01); *H04L 5/0021* (2013.01); *H04W 8/005* (2013.01); *H04W 72/0406* (2013.01); *H04W 72/1263* (2013.01)

(58) Field of Classification Search
CPC ........... H04W 72/005; H04W 72/0406; H04W 72/1263; H04W 8/005; H04L 5/0021
(Continued)

(56) References Cited

U.S. PATENT DOCUMENTS

2016/0119184 A1 4/2016 Soriaga et al.
2016/0270053 A1* 9/2016 Zeng ................ H04W 52/0212
(Continued)

OTHER PUBLICATIONS

Cao Y., et al., "Resource Spread Multiple Access—A Novel Transmission Scheme for 5G Uplink", 2017 IEEE 86th Vehicular Technology Conference (VTC-FALL), IEEE, Sep. 24, 2017 (Sep. 24, 2017), pp. 1-5, XP033320013, DOI: 10.1109/VTCFALL.2017.8288412, [retrieved on Feb. 8, 2018].
(Continued)

*Primary Examiner* — Faisal Choudhury
(74) *Attorney, Agent, or Firm* — Arent Fox LLP; Nerrie M. Zohn

(57) ABSTRACT

Aspects of the present disclosure provide techniques to reduce overhead and improve resource management by efficiently selecting RSMA spreading code for periodic traffic in IoE devices. For example, in accordance with one technique, the IoE device, during an initial access to the base station, may notify the base station of the traffic periodicity of the IoE device such that the base station may assign a spreading code from a dedicated pool that is not utilized during the periodic access of the device. Additionally or alternatively, another technique to reduce overhead and improve resource management may include the IoE devices broadcasting the selected RSMA spreading code that the IoE devices intends to use in discovery broadcasts (DBs) along with the IoE device traffic periodicity such that the IoE devices may autonomously manage selection of RSMA spreading code that avoids collisions for the same traffic periodicity.

16 Claims, 8 Drawing Sheets

(51) Int. Cl.
*H04W 72/04* (2009.01)
*H04W 8/00* (2009.01)
*H04W 72/12* (2009.01)

(58) Field of Classification Search
USPC .......................................................... 370/329
See application file for complete search history.

(56) References Cited

U.S. PATENT DOCUMENTS

2016/0270083 A1* 9/2016 Zeng ................. H04W 72/0486
2018/0123765 A1* 5/2018 Cao ........................ H04L 1/1822
2019/0357025 A1* 11/2019 Hwang ................... H04L 5/001
2020/0008221 A1* 1/2020 Keating ................ H04L 5/0094
2020/0322079 A1* 10/2020 Cao ..................... H04L 27/2605

OTHER PUBLICATIONS

International Search Report and Written Opinion—PCT/US2019/033840—ISA/EPO—dated Aug. 12, 2019.

* cited by examiner

TECHNIQUES FOR SELECTING RSMA SPREADING CODE FOR PERIODIC TRAFFIC IN INTERNET-OF-EVERYTHING DEVICES

CROSS-REFERENCE TO RELATED APPLICATION(S)

This application claims benefit of U.S. Provisional Application Ser. No. 62/679,592, entitled "Techniques for Selecting RSMA Spreading Code for Periodic Traffic in Internet-of-Everything Devices" and filed Jun. 1, 2018, which is expressly incorporated by reference herein in its entirety.

BACKGROUND

Aspects of the present disclosure relate generally to wireless communication networks, and more particularly, to techniques for selecting Resource Spread Multiple Access (RSMA) spreading code for periodic traffic in internet-of-everything (IoE) devices in wireless IoE network.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with IoE), and other requirements. Some aspects of 5G NR may be based on the 4G Long Term Evolution (LTE) standard.

In some examples, the wireless communications technology continues to expand and support diverse usage scenarios and applications with respect to current mobile network generations. One such example may include support of vast IoE (or "IoT") devices that may be deployed across the wireless network. There, however, exists a need for further improvements in 5G NR technology, including resource selection management. These improvements may also be applicable to other multi-access technologies and the telecommunication standards that employ these technologies.

SUMMARY

Aspects of the present disclosure provide techniques to reduce overhead and improve resource management by efficiently selecting RSMA spreading code for periodic traffic in IoE devices. For example, in accordance with one technique, the IoE device, during an initial access to the base station, may notify the base station of the traffic periodicity of the IoE device such that the base station may assign a spreading code from a dedicated pool that is not utilized during the periodic access of the device. Additionally or alternatively, another technique to reduce overhead and improve resource management may include the IoE devices broadcasting the selected RSMA spreading code that the IoE devices intends to use in discovery broadcasts (DBs) along with the IoE device traffic periodicity such that the IoE devices may autonomously manage selection of RSMA spreading code that avoids collisions for the same traffic periodicity.

In one example, a method implemented by IoE device for wireless communication is disclosed. The method may include establishing, at an IoE device, initial access with a base station during a first time period based on selection of a first RSMA spreading code from a first access pool. The first access pool may include a first set of RSMA spreading codes. The method may further include transmitting a notification to the base station during the initial access that includes information associated with uplink traffic periodicity and access duration of the IoE device. The method may further include receiving, from the base station, an assignment of a second RSMA spreading code from a second access pool in response to the notification, wherein the second access pool includes a second set of RSMA spreading codes. The method may further include selecting the second RSMA spreading code for periodic uplink communication with the base station during a second time period.

In another example, an apparatus for wireless communication is disclosed. The apparatus device may include a memory configured to store instructions, and a processor communicatively coupled with the memory. The processor may be configured to execute the instructions to establish, at an IoE device, initial access with a base station during a first time period based on selection of a first RSMA spreading code from a first access pool. The first access pool may include a first set of RSMA spreading codes. The processor may further be configured to execute the instructions to transmit a notification to the base station during the initial access that includes information associated with uplink traffic periodicity and access duration of the IoE device. The processor may further be configured to execute the instructions to receive, from the base station, an assignment of a second RSMA spreading code from a second access pool in response to the notification, wherein the second access pool includes a second set of RSMA spreading codes. The processor may further be configured to execute the instructions to select the second RSMA spreading code for periodic uplink communication with the base station during a second time period.

In another example, a computer readable medium for wireless communication is disclosed. The computer readable medium may include code for establishing, at an IoE device, initial access with a base station during a first time period based on selection of a first RSMA spreading code from a first access pool. The first access pool may include a first set of RSMA spreading codes. The computer readable medium may further include code for transmitting a notification to the base station during the initial access that includes information associated with uplink traffic periodicity and access duration of the IoE device. The computer readable medium may further include code for receiving, from the base station, an assignment of a second RSMA spreading code from a second access pool in response to the notification, wherein the second access pool includes a second set of RSMA spreading codes. The computer readable medium may further include code for selecting the second RSMA spreading code for periodic uplink communication with the base station during a second time period.

In another example, another apparatus for wireless communication is disclosed. The apparatus may include means for establishing, at an IoE device, initial access with a base station during a first time period based on selection of a first RSMA spreading code from a first access pool. The first access pool may include a first set of RSMA spreading codes. The apparatus may further include means for transmitting a notification to the base station during the initial access that includes information associated with uplink traffic periodicity and access duration of the IoE device. The apparatus may further include means for receiving, from the base station, an assignment of a second RSMA spreading code from a second access pool in response to the notification, wherein the second access pool includes a second set of RSMA spreading codes. The apparatus may further include means for selecting the second RSMA spreading code for periodic uplink communication with the base station during a second time period.

In another example, another method implemented by IoE device for wireless communication is disclosed. The method may include selecting, at a first IoE device, a first RSMA spreading code for uplink periodic communication with a base station. The method may further include generating a first broadcast message that includes the selected RSMA spreading code for the first IoE device in addition to information associated with uplink traffic periodicity of the first IoE device. The method may further include transmitting the first broadcast message from the first IoE device to at least one second IoE device in a discovery broadcast.

In another example, an apparatus for wireless communication is disclosed. The apparatus may include a memory configured to store instructions, and a processor communicatively coupled with the memory. The processor may be configured to execute the instructions to select, at a first IoE device, a first RSMA spreading code for uplink periodic communication with a base station. The processor may further be configured to execute the instructions to generate a first broadcast message that includes the selected RSMA spreading code for the first IoE device in addition to information associated with uplink traffic periodicity of the first IoE device. The processor may further be configured to execute the instructions to transmit the first broadcast message from the first IoE device to at least one second IoE device in a discovery broadcast.

In another example, a computer readable medium for wireless communication is disclosed. The computer readable medium may include code for selecting, at a first IoE device, a first RSMA spreading code for uplink periodic communication with a base station. The computer readable medium may further include code for generating a first broadcast message that includes the selected RSMA spreading code for the first IoE device in addition to information associated with uplink traffic periodicity of the first IoE device. The computer readable medium may further include code for transmitting the first broadcast message from the first IoE device to at least one second IoE device in a discovery broadcast.

In another example, another apparatus for wireless communication is disclosed. The apparatus may include means for selecting, at a first IoE device, a first RSMA spreading code for uplink periodic communication with a base station. The apparatus may further include means for generating a first broadcast message that includes the selected RSMA spreading code for the first IoE device in addition to information associated with uplink traffic periodicity of the first IoE device. The apparatus may further include means for transmitting the first broadcast message from the first IoE device to at least one second IoE device in a discovery broadcast.

In another example, a method implemented by a base station for wireless communication is disclosed. The method may include receiving, at a base station, an initial access request from an IoE device during a first time period based on selection of a first RSMA spreading code from a first access pool, wherein the first access pool includes a first set of RSMA spreading codes. The method may further include receiving, during the first time period, a notification from the IoE device that includes information associated with uplink traffic periodicity and access duration of the IoE device. The method may further include assigning the IoE device a second RSMA spreading code from a second access pool in response to the notification, wherein the second access pool includes a second set of RSMA spreading codes. The method may further include transmitting an assignment information to the IoE device allocating the second RSMA spreading code to the IoE device for subsequent uplink communications with the base station during a second time period.

In another example, an apparatus implemented by a base station for wireless communication is disclosed. The apparatus may include a memory configured to store instructions, and a processor communicatively coupled with the memory. The processor may be configured to execute the instructions to receive, at a base station, an initial access request from an IoE device during a first time period based on selection of a first RSMA spreading code from a first access pool, wherein the first access pool includes a first set of RSMA spreading codes. The processor may further be configured to execute the instructions to receive, during the first time period, a notification from the IoE device that includes information associated with uplink traffic periodicity and access duration of the IoE device. The processor may further be configured to execute the instructions to assign the IoE device a second RSMA spreading code from a second access pool in response to the notification, wherein the second access pool includes a second set of RSMA spreading codes. The processor may further be configured to execute the instructions to transmit an assignment information to the IoE device allocating the second RSMA spreading code to the IoE device for subsequent uplink communications with the base station during a second time period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
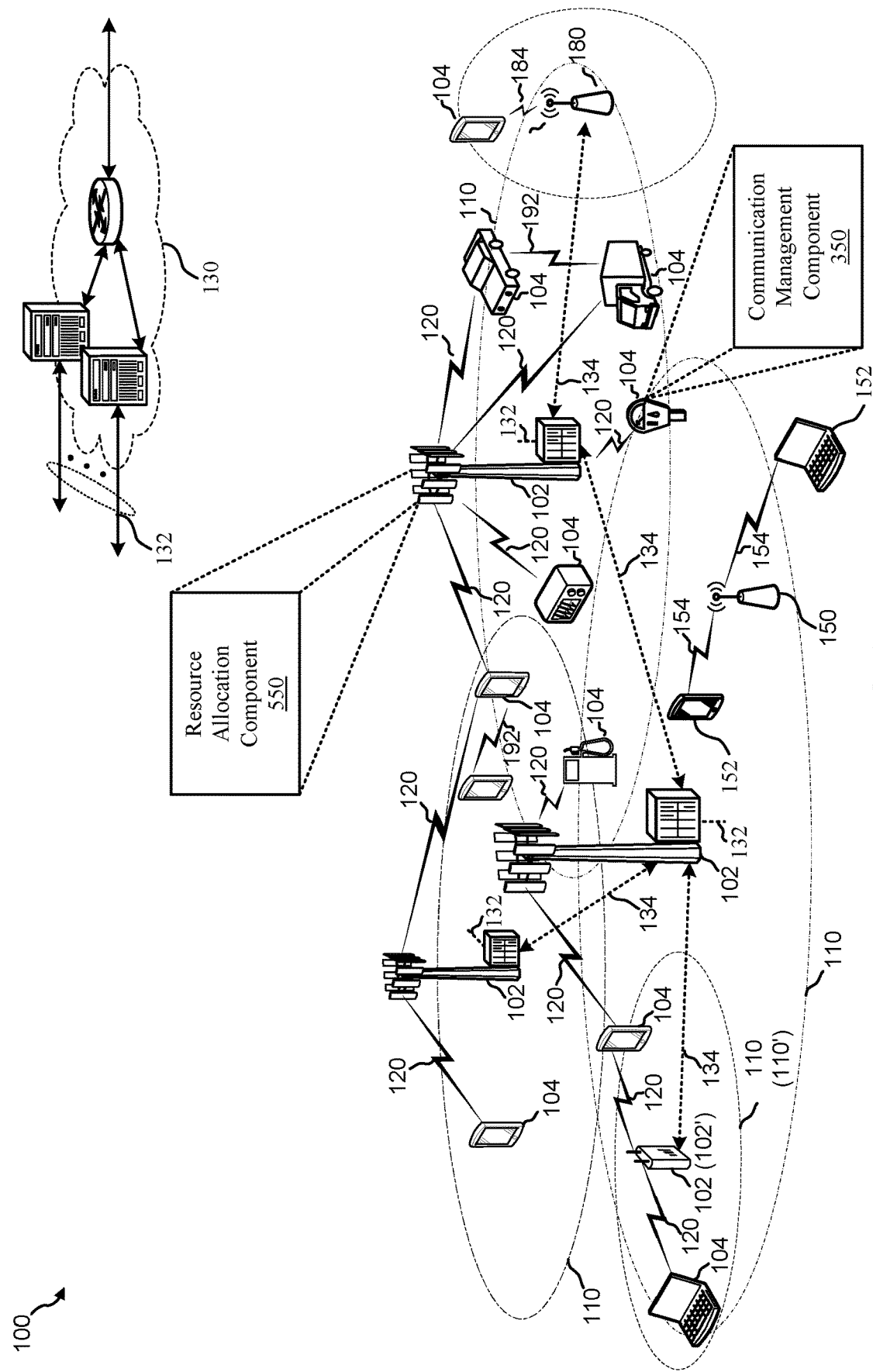
FIG. 1 illustrates an example of a wireless communications system in accordance with aspects of the present disclosure.

As noted above, emerging wireless communication systems such as 5G NR may support vast array of IoE devices that may be examples of sensors and other devices that may be deployed across the network. Some examples of IoE devices may include smart meter sensors, temperature monitoring devices, pressure monitoring devices, etc. Generally, IoE devices have two types of traffic to communicate with the wireless communication network: periodic and sporadic. While periodic transmission may include, for example, regular reporting from IoE devices (e.g., temperature and humidity sensors), sporadic transmissions may include event based triggers (e.g., urgent notification messages based on detection of water leak). Periodic traffic in IoE devices may also include different periodicities (e.g., first periodicity and second periodicity).

With respect to periodic traffic, IoE devices may employ resource spread multiple access (RSMA) for communication on the uplink (UL) and/or downlink (DL). In particular, RSMA may enable multiple data streams (e.g., data streams of different user equipments (UEs), base stations, etc., and/or multiple data streams from a single user equipment, base station, etc.) to share a single resource element (e.g., time and/or frequency resource element, such as similar to TDMA and FDMA resources). For example, RSMA may enable asynchronous, non-orthogonal, and/or contention based access to resources. In certain aspects, data (e.g., bits) of a single data stream may be spread through low rate coding across multiple resource elements in time and/or frequency. Different signals carrying different data may occupy the same resource elements, while being separated (e.g., multiplied) with different codes (e.g., scrambling codes, spreading codes, etc.), similar to CDMA.

In order to avoid collision of multiple IoE devices selecting the same RSMA spreading code (and thereby failing to successfully transmit uplink traffic), the IoE devices may utilize a combination of common access pool and collision reduction pool that each include a set of RSMA spreading codes. Specifically, the IoE devices may first utilize the common access pool for selecting RSMA spreading codes for initial uplink transmission (e.g., establishing communication with base station) or for short-duration access (e.g., burst transmission). For longer-duration access (e.g., due to higher pathloss), the IoE devices may transition from the common access pool to a separate resource pool—the collision reduction pool—in order to select the RSMA spreading code for transmitting uplink traffic on shared resources. Generally, the common access pool may include a smaller set of RSMA spreading code than the set of RSMA spreading codes included in the collision reduction pool. As such, there is a higher likelihood of multiple IoE devices selecting the same RSMA spreading code from the common access pool than from the collision reduction pool.

As noted above, in current systems, the IoE devices are required to first select an RSMA spreading code from the common access pool for each access before transitioning to the collision reduction pool, if necessary. However, many IoE devices are generally static devices that remain fixed in location (e.g., utility meters, sensors, etc.). If the static IoE device is in a location with poor signal quality (e.g., basement of a building for a humidity sensor), that particular IoE device may always suffer with high pathloss (e.g., greater likelihood of packet dropping due to poor uplink signal quality). Despite the known circumstances of such IoE devices, for any uplink periodic communication, the current systems require such IoE devices to still select RSMA spreading codes first from common access pool that have higher likelihood of collisions before transitioning to a secondary collision reduction pool that may be larger than the common access pool, and by extension provide lower likelihood of collision (higher probability of successful transmission). Such an approach results in higher overhead on each periodic access, as well as higher collision probability for common pool, thereby resulting in inefficient management of resources.

Aspects of the present disclosure provide multiple techniques to reduce overhead and improve resource management by efficiently selecting RSMA spreading code for periodic traffic in IoE devices. For example, in accordance with the first technique, the IoE device, during an initial access to the base station, may select a RSMA spreading code from the common access pool. However, during the initial access, the IoE device may notify the base station of the traffic periodicity of the IoE device such that the base station may assign a spreading code from a dedicated pool that is not utilized during the periodic access of the device. Specifically, since the base station may be informed of traffic periodicity of the other IoE devices on the wireless network, the base station may be equipped to assign RSMA spreading codes to the IoE devices such that no two IoE devices select the same RSMA spreading code during the overlapping traffic periodicity (e.g., the time during which the IoE devices are likely to initiate uplink traffic). To this, in accordance with the first technique, the base station may reserve the RSMA spreading code for a time period, including the device access time and any additional margin (e.g., for timing offset, channel variation, or expected traffic variance) on a periodic basis.

Additionally or alternatively, a second technique to reduce overhead and improve resource management may include the IoE devices broadcasting the selected RSMA spreading code that the IoE devices intends to use in discovery broadcasts (DBs) along with the IoE device traffic periodicity. Because all IoE devices may be awake to receive the broadcast messages transmitted by other IoE devices, the IoE devices may autonomously manage selection of RSMA spreading code such that no two IoE devices select the same RSMA spreading code for the same traffic periodicity. In this example, the new IoE devices that may join the network may select the RSMA spreading code that avoids conflicts with existing usage by other IoE devices in the network.

Both techniques provided here provide improvement over current systems so far they improve overall efficiency and reduce overhead that is associated with IoE devices unnecessarily selecting RSMA spreading codes that provide high probability of collisions, and thus impact transmission rate due to high packet loss and delay.

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC). In some examples, the UEs 104 may be IoT devices (e.g., parking meter) that communicate wireless to the base station 102. It should be noted that for purposes of this disclosures, the terms "UE," "IoT," and "IoE" devices may be used interchangeably. In some examples, the wireless communications system may also include the core network 130 that may provide user authentication, access authorization, tracking, internet protocol (IP) connectivity, and other access, routing, or mobility functions. The core network 130 may allow circuit-switched connectivity to the back-end operator network (e.g., public land mobile network (PLMN) and/or packet-switched connectivity to private networks, operator's intranet or to the public internet.

In one example, the UE 104 may include a communication management component 350 (see FIG. 3) for reducing overhead for uplink periodic transmission. In one instance, the communication management component 350 may select a RSMA spreading code from the common access pool during initial access to the base station 102. During the initial access, the communication management component 350 may notify the base station 102 of the traffic periodicity of the IoE device 104 such that the base station 102 may assign a spreading code from a dedicated pool that is not utilized during the periodic access of the device. To this end, the base station 102 may include a resource allocation component 550 (see FIG. 5) to assign a spreading code to one or more IoE devices 104 from a dedicated pool that is not utilized during the periodic access of the device by other IoE devices 104 in the network. Specifically, since the base station 102 may be informed of traffic periodicity of the other IoE devices 104 on the wireless network, the base station 102, and more specifically the resource allocation component 350 may be better equipped to assign RSMA spreading codes to the IoE devices 104 such that no two IoE devices 104 may select the same RSMA spreading code during overlapping traffic periodicity (e.g., the time during which the IoE devices are likely to initiate uplink traffic). As such, by way of resource allocation component 550, the base station 102 may reserve the RSMA spreading code for a IoE device 104 for a time period, including the device access time and any additional margin (e.g., for timing offset, channel variation, or expected traffic variance) on a periodic basis.

Additionally or alternatively, the communication management component 350 of the IoE device 104 may broadcast the selected RSMA spreading code that the IoE device 104 intends to use in discovery broadcasts (DBs) along with the IoE device traffic periodicity. Because all IoE devices 104 may be awake to receive the broadcast messages transmitted by other IoE devices 104, the communication management component 350 may autonomously manage selection of RSMA spreading code such that no two IoE devices 104 select the same RSMA spreading code for the same traffic periodicity. In this example, any new IoE devices 104 that may join the network may select the RSMA spreading code that avoids conflicts with existing usage by other IoE devices 104 in the network.

The base stations 102 may include macro cells (high power cellular base station) and/or small cell base stations (low power cellular base station). The base stations 102 may interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell base station 102' may have a coverage area 110' that overlaps the coverage area 110 of one or more macro cell base stations 102. A network that includes both small cell base stations and macro cell base stations may be known as a heterogeneous network. A heterogeneous network may also include Home Evolved Node Base Stations (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ NR and use the same 5 GHz unlicensed frequency spectrum as used by the Wi-Fi AP 150. The small cell base station 102', employing NR in an unlicensed frequency spectrum, may boost coverage to and/or increase capacity of the access network.

A gNodeB (gNB) or eNodeB (eNB)180 (one or both of gNB and eNB may also be referred to as "base station") may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. It should be appreciated by those of ordinary skill in the art that the present invention is not just limited to mmW, but may also include any other frequencies used for wireless communication. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. In an aspect, a gNB 180 operating using mmW may utilize beamforming 184 with the UE 104 to compensate for the extremely high path loss and short range. Additionally, UEs 104 performing D2D communications may operate using mmW and may also utilize beamforming 184.

The EPC may include a Mobility Management Entity (MME), other MMEs 164, a Serving Gateway, a Multimedia Broadcast Multicast Service (MBMS) Gateway 168, a Broadcast Multicast Service Center (BM-SC), and a Packet Data Network (PDN) Gateway. The MME may be in communication with a Home Subscriber Server (HSS) 174. The MME is the control node that processes the signaling between the UEs 104 and the EPC. Generally, the MME provides bearer and connection management. All user Internet protocol (IP) packets are transferred through the Serving Gateway, which itself is connected to the PDN Gateway. The PDN Gateway provides UE IP address allocation as well as other functions. The PDN Gateway 172 and the BM-SC are connected to the IP Services. The IP Services may include the Internet, an intranet, an IP Multimedia Subsystem (IMS), a PS Streaming Service, and/or other IP services. The BM-SC may provide functions for MBMS user service provisioning and delivery. The BM-SC may serve as an entry point for content provider MBMS transmission, may be used to authorize and initiate MBMS Bearer Services within a public land mobile network (PLMN), and may be used to schedule MBMS transmissions. The MBMS Gateway may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, the wireless communication system may also support wireless IoE networks. A wireless IoE network may be a network of physical objects or things embedded with electronics, software, sensors and connectivity to enable it to achieve greater value and service by exchanging data with the manufacturer, operator and/or other connected devices. Each thing (i.e., an IoE device) may be uniquely identifiable through its embedded computing system but is able to interoperate within the existing Internet infrastructure. A wireless IoE network may offer advanced connectivity of devices, systems, and services that goes beyond machine-to-machine communications (M2M) and covers a variety of protocols, domains, and applications. Things (i.e., IoE devices), in the wireless IoE network, can refer to a wide variety of devices such as heart monitoring implants, biochip transponders on farm animals, electric clams in coastal waters, automobiles with built-in sensors, or field operation devices that assist fire-fighters in search and rescue. These devices collect useful data with the help of various existing technologies and then autonomously flow the data between other devices. Examples include smart thermostat systems and washer/dryers that utilize WiFi for remote monitoring. In certain configurations, a wireless IoE network may employ a wireless ad hoc network structure. In certain configurations, a wireless IoE network may employ a wireless mesh network structure.

In some examples, the wireless communication system may be a mmW communication system. In mmW communication systems (e.g., access network 100), a line of sight (LOS) may be needed between a transmitting device (e.g., base station 102) and a receiving device (e.g., UE 104), or between two UEs 104. Frequency is very high in mmW communication systems which means that beam widths are very small, as the beam widths are inversely proportional to the frequency of the waves or carriers transmitted by an antenna of the transmitting device. Beam widths used in mmW communications are often termed as "pencil beams." The small wavelengths may result in many objects or materials acting as obstacles including even oxygen molecules. Therefore, LOS between the transmitter and receiver may be required unless a reflected path is strong enough to transmit data. Further, in some examples, base stations may track UEs 104 to focus beams for communication.

During LOS situations, tracking of the UE 104 may be performed by the base station 102 or another UE 104 by focusing a beam onto the tracked UE 104. However, if the receiving UE 104 is in a Non-Line of Sight (NLOS) position, then a transmitter of the base station 102 may need to search for a strong reflected path which is not always available. An example of a UE 104 being in a NLOS position may include a first UE 104 located within a vehicle. When the first UE 104 is located within the vehicle, a base station 102 may have difficulty retaining LOS and the difficulty of retaining LOS may further increase when the vehicle is moving.

Further, compared to lower frequency communication systems, a distance between base stations 102 in a mmW communication system may be very short (e.g., 150-200 meters between gNBs). The short distances may result in a short amount of time required for a handover between base stations 102. The short distance and the fast handovers may cause difficulty to the base station 102 in maintaining a LOS beam on a UE 104 when the UE 104 is, for example, located within a vehicle as even small obstacles like a user's finger on the UE 104 or the vehicle windows or windshield act as obstacles to maintaining the LOS.

One way to overcome LOS issues is by using CV2X technologies. In CV2X technology, a vehicle can communicate with at least one of one or more cellular networks, one or more vehicles, and/or one or more cellular configured devices. To communicate with other devices the CV2X technology may use antennas that are compatible with mmW communication systems.

In certain aspects, one or more UEs 104 may be configured for CV2X communications between UEs 104. The UEs 104 may include various devices related to vehicles and transportation. For example, the UEs 104 may include vehicles, devices within vehicles, and transportation infrastructure such as roadside devices, tolling stations, fuel supplies, or any other device that that may communicate with a vehicle. A UE 104 may act as either a host device or a client device for CV2X communication. A host UE 104 may advertise CV2X services supported by the host UE 104. A client UE 104 may discover CV2X services supported by the host UE 104. Moreover, a UE 104 may act as both a host and a client. For example, a vehicle may act as a host to provide speed and braking updates to surrounding vehicles and act as a client to communicate with a tolling station. Accordingly, a single UE 104 may include both a host discovery component and a client discovery component.

Figure 2A:
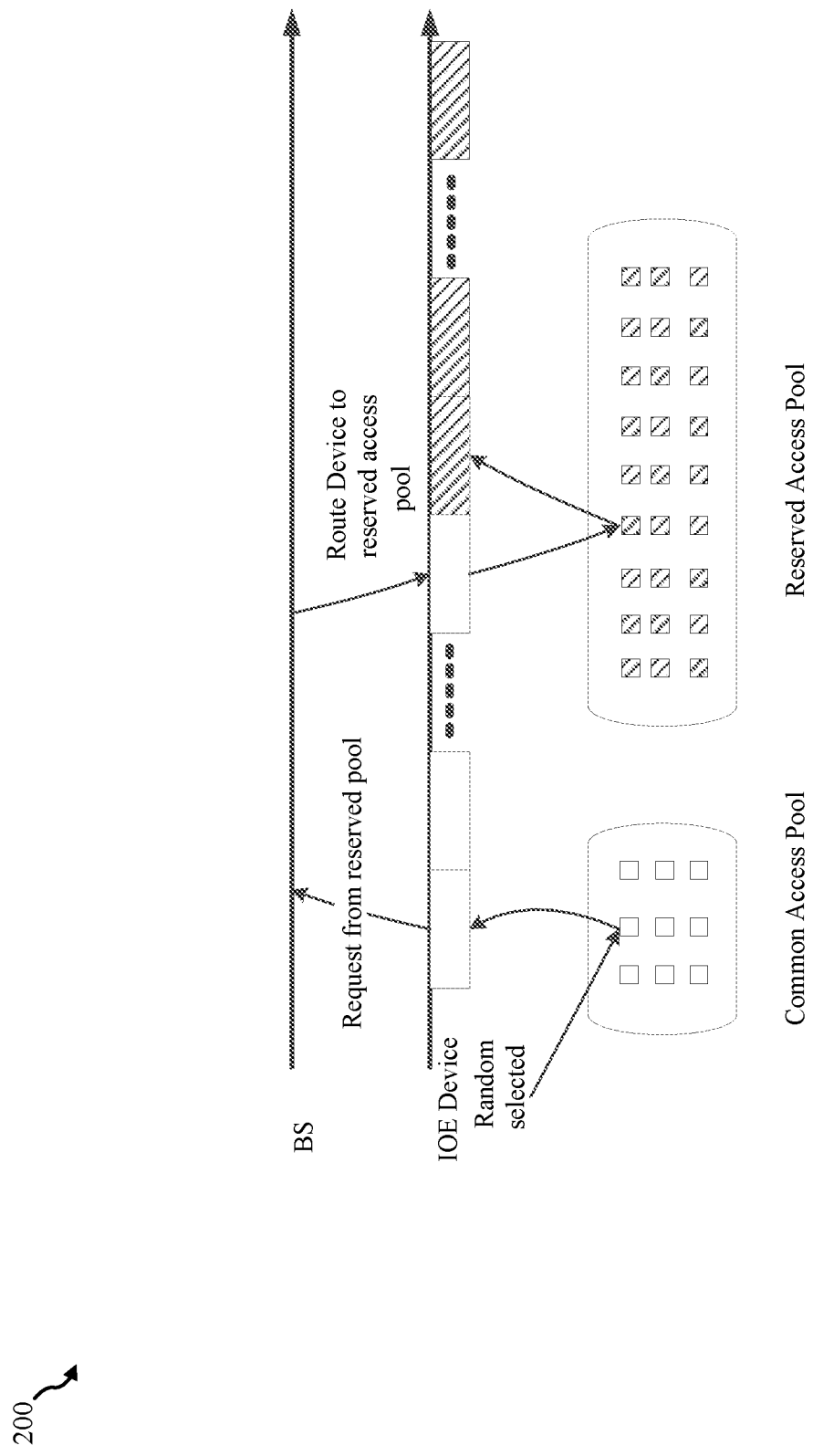
FIG. 2A illustrates an example of the timing diagram for persistent access resource management in accordance with first techniques of the present disclosure.

FIG. 2A illustrates an example of the timing diagram 200 for persistent access resource management in accordance with first techniques of the present disclosure. In accordance with the first technique, the IoE device, during an initial access to the base station, may select a RSMA spreading code from the common access pool. However, during the initial access, the IoE device may notify the base station of the traffic periodicity of the IoE device such that the base station may assign a spreading code from a dedicated pool that is not utilized during the periodic access of the device. Specifically, since the base station may be informed of traffic periodicity of the other IoE devices on the wireless network, the base station may be equipped to assign RSMA spreading codes to the IoE devices such that no two IoE devices select the same RSMA spreading code during the overlapping traffic periodicity (e.g., the time during which the IoE devices are likely to initiate uplink traffic). To this, in accordance with the first technique, the base station may reserve the RSMA spreading code for a time period, including the device access time and any additional margin (e.g., for timing offset, channel variation, or expected traffic variance) on a periodic basis.

Figure 2B:
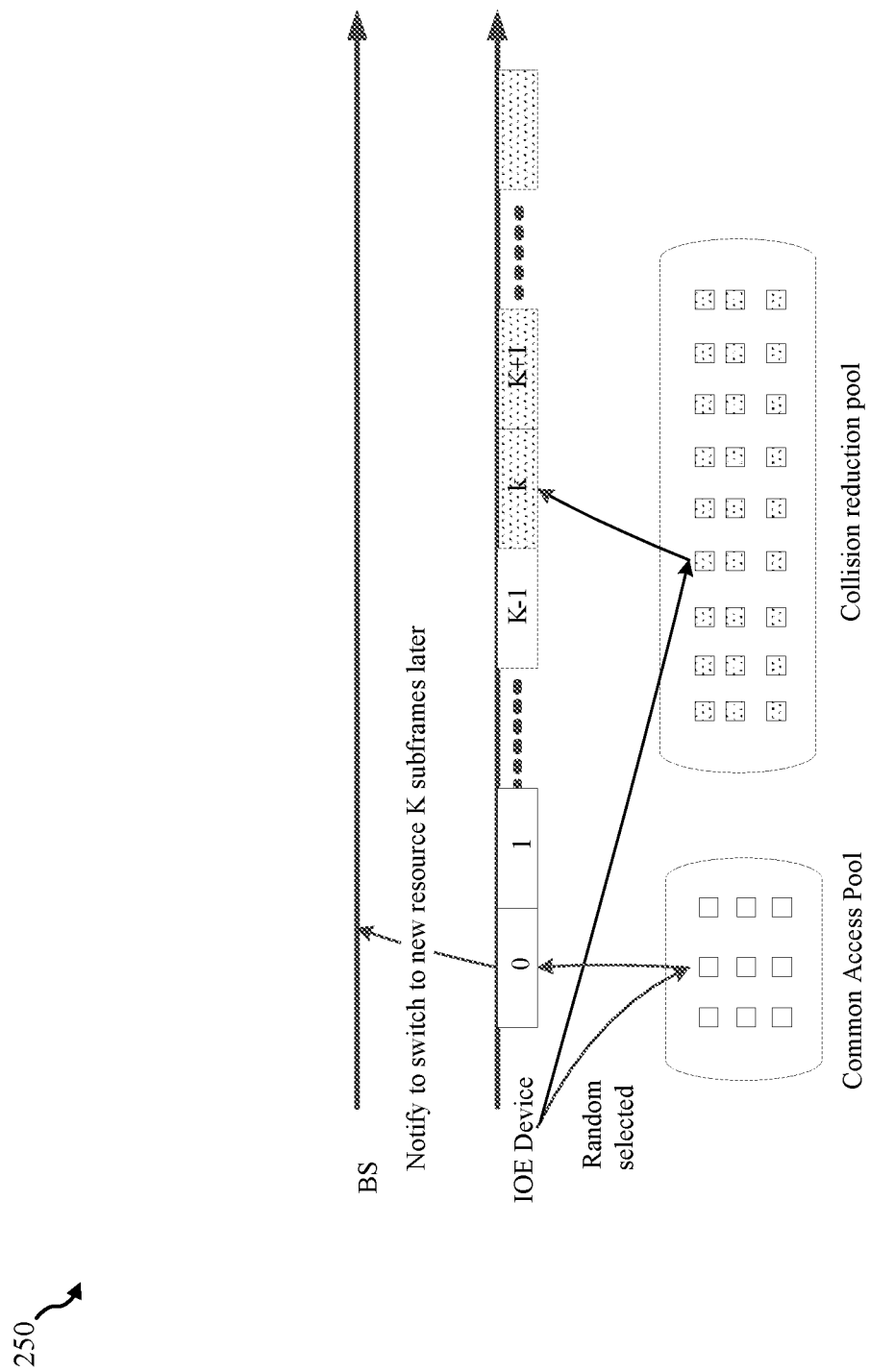
FIG. 2B illustrates an example of the timing diagram for persistent access resource management in accordance with second techniques of the present disclosure.

FIG. 2B illustrates an example of the timing diagram 250 for persistent access resource management in accordance with second techniques of the present disclosure. The second technique to reduce overhead and improve resource management may include the IoE devices broadcasting the selected RSMA spreading code that the IoE devices intends to use in discovery broadcasts (DBs) along with the IoE device traffic periodicity. Because all IoE devices may be awake to receive the broadcast messages transmitted by other IoE devices, the IoE devices may autonomously manage selection of RSMA spreading code such that no two IoE devices select the same RSMA spreading code for the same traffic periodicity. In this example, the new IoE devices that may join the network may select the RSMA spreading code that avoids conflicts with existing usage by other IoE devices in the network.

Figure 3:
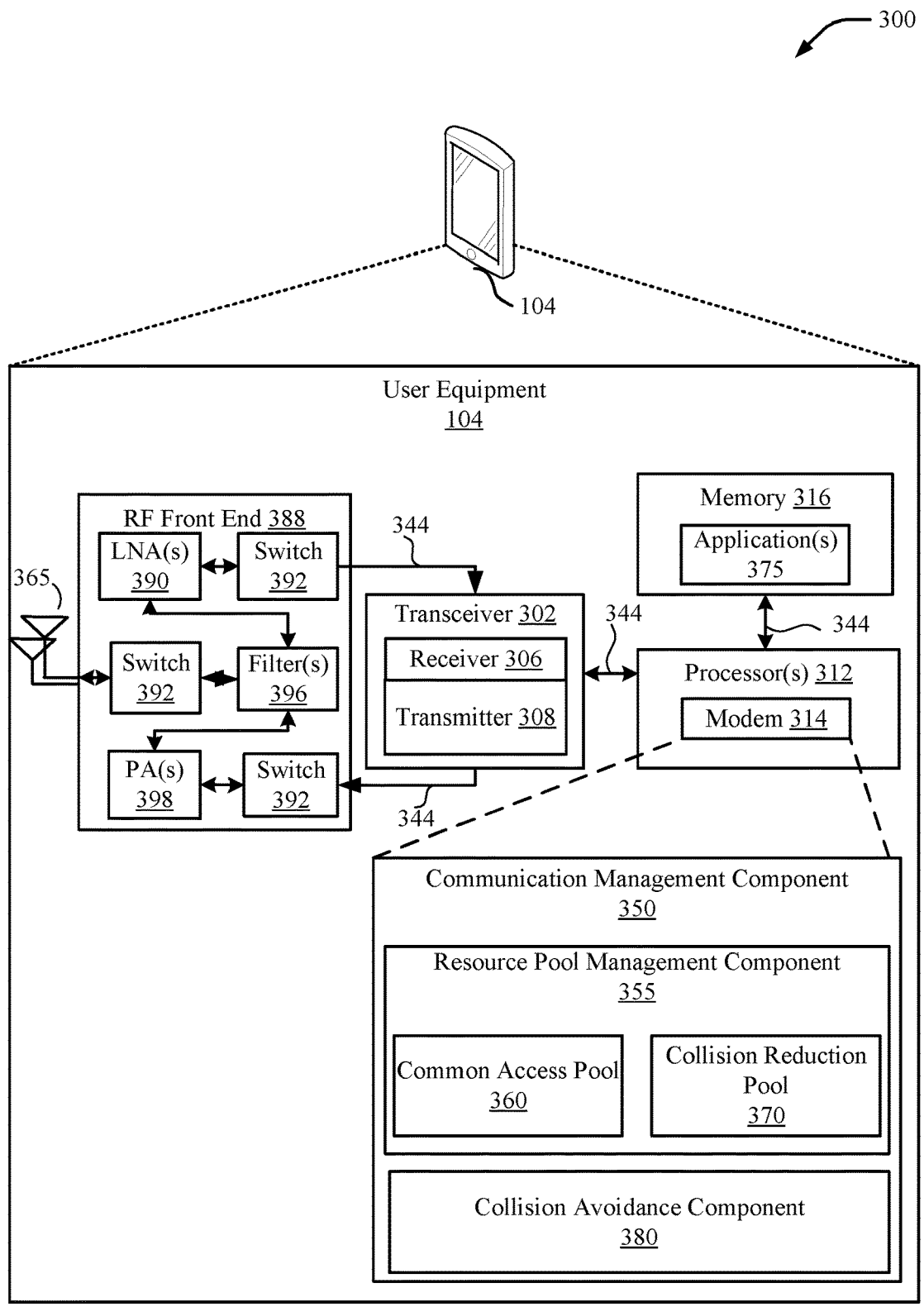
FIG. 3 illustrates an example of a schematic diagram of an aspect of an implementation of various components of a UE in accordance with various aspects of the present disclosure.

FIG. 3 illustrates a hardware components and subcomponents of a device that may be a UE 104 or IoE device for implementing one or more methods (e.g., method 400) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the communication management component 350 to perform functions described herein related to including one or more methods (e.g., 400 and 450) of the present disclosure. In some examples, the communication management component 350 may include resource pool management component 355 for selecting RSMA sequence codes for uplink transmission from one of common access pool 360 or collision reduction pool 370. In some examples, the communication management component 350 may also include collision avoidance component 380 for resolving situations when at least one other IoE device on the network selects the same RSMA sequence code as the IoE device.

In some examples, the common access pool 360 may include a first set of RSMA sequence codes, while the collision reduction pool 370 may include a second set of RSMA sequence codes. In some aspects, the size of the first set of RSMA sequence codes in the common access pool 360 may be smaller (in quantity) than the second set of RSMA sequence codes in the collision reduction pool 370. In one example, the communication management component 350 may select a RSMA spreading code from the common access pool during initial access to the base station 102.

During the initial access, the communication management component 350 may notify the base station 102 of the traffic periodicity of the IoE device 104 such that the base station 102 may assign a spreading code from a dedicated pool that is not utilized during the periodic access of the device. In another example, the communication management component 350 of the IoE device 104 may broadcast the selected RSMA spreading code that the IoE device 104 intends to use in discovery broadcasts (DBs) along with the IoE device traffic periodicity. Because all IoE devices 104 may be awake to receive the broadcast messages transmitted by other IoE devices 104, the communication management component 350 may autonomously manage selection of RSMA spreading codes via resource pool management component 355 such that no two IoE devices 104 select the same RSMA spreading code for the same traffic periodicity from one of common access pool 360 or collision reduction pool 370.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to communication management component 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with communication management component 350 may be performed by transceiver 302.

The memory 316 may be configured to store data used herein and/or local versions of application(s) 375 or communication management component 350 and/or one or more of its subcomponents being executed by at least one processor 312. The memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining communication management component 350 and/or one or more of its subcomponents, and/or data associated therewith, when the UE 104 is operating at least one processor 312 to execute communication management component 350 and/or one or more of its subcomponents.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 388. In an aspect, the transceiver 302 may be tuned to operate at specified frequencies such that transmitting device can communicate with, for example, one or more base stations 102 or one or more cells associated with one or more base stations 102. In an aspect, for example, the modem 314 can configure the transceiver 302 to operate at a specified frequency and power level based on the configuration of the transmitting device and the communication protocol used by the modem 314.

In an aspect, the modem 314 can be a multiband-multimode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4A:
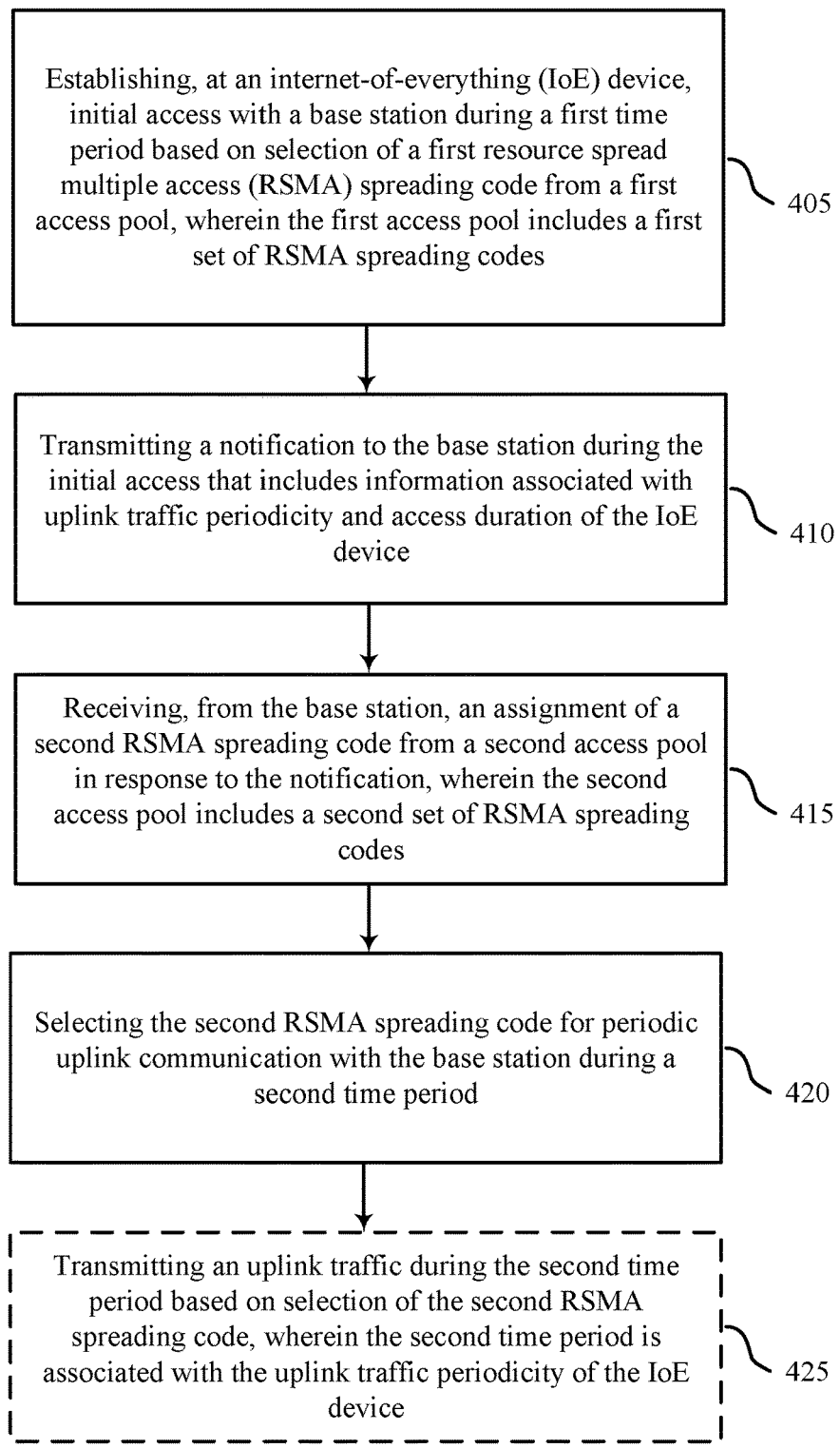
FIGS. 4A and 4B illustrate examples of methods of wireless communication implemented by the UE in accordance with aspects of the present disclosure.

FIG. 4A is a flowchart of an example method 400 for wireless communications in accordance with aspects of the present disclosure. The method 400 may be performed using the IoE device (e.g., UE 104). Although the method 400 is described below with respect to the elements of the IoE device/UE 104, other components may be used to implement one or more of the steps described herein.

At block 405, the method 400 may include establishing, at an IoE device, initial access with a base station during a first time period based on selection of a first RSMA spreading code from a first access pool, wherein the first access pool includes a first set of RSMA spreading codes. Aspects of block 405 may be performed by communication management component 350 described with reference to FIG. 3.

At block 410, the method 400 may include transmitting a notification to the base station during the initial access that includes information associated with uplink traffic periodicity and access duration of the IoE device. Aspects of block 410 may be performed by transceiver 302 described with reference to FIG. 3.

At block 415, the method 400 may include receiving, from the base station, an assignment of a second RSMA spreading code from a second access pool in response to the notification, wherein the second access pool includes a second set of RSMA spreading codes. In some examples, the assignment of the second RSMA spreading code includes reservation of the second RSMA spreading code for designated duration of time. The designated duration of time may include at least one of device access time duration and delay margin, including the delay margin includes one or more of timing offset, channel variation, or expected traffic arrival variance on periodic basis. Aspects of block 415 may be performed by receiver 306 described with reference to FIG. 3.

At block 420, the method 400 may include selecting the second RSMA spreading code for periodic uplink communication with the base station during a second time period. Aspects of block 420 may be performed by resource pool management component 355 described with reference to FIG. 3.

At block 425, the method 400 may optionally include transmitting an uplink traffic during the second time period based on selection of the second RSMA spreading code, wherein the second time period is associated with the uplink traffic periodicity of the IoE device. Aspects of block 425 may be performed by transceiver 302 described with reference to FIG. 3.

Figure 4B:
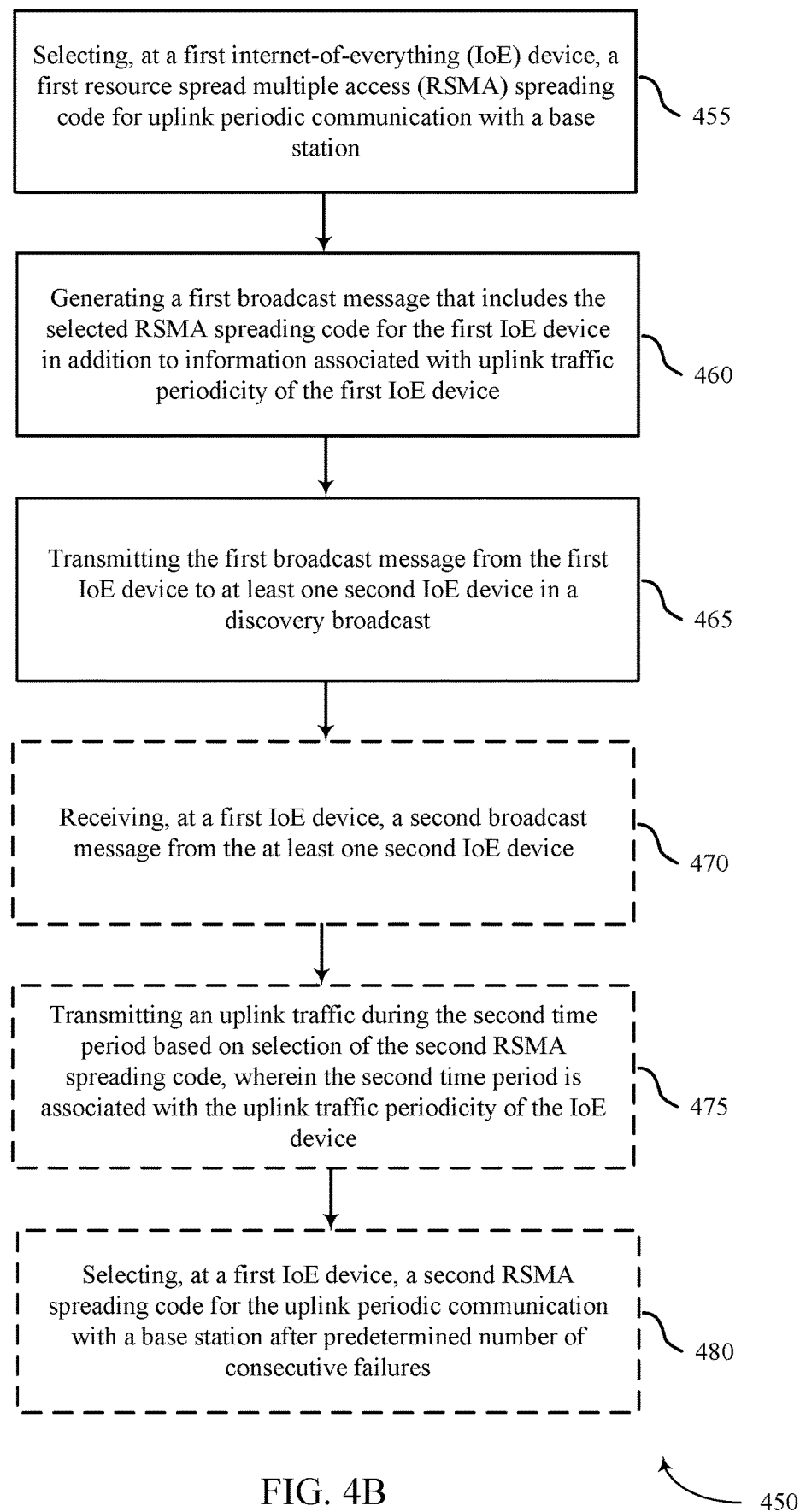

FIG. 4B is another flowchart of an example method 450 for wireless communications in accordance with aspects of the present disclosure. The method 450 may be performed using the IoE device (e.g., UE 104). Although the method 450 is described below with respect to the elements of the IoE device/UE 104, other components may be used to implement one or more of the steps described herein.

At block 455, the method 450 may include selecting, at a first IoE device, a first RSMA spreading code for uplink periodic communication with a base station. In some examples, the first RSMA spreading code may be selected from one of a first access pool or a second access pool, wherein the first access pool includes a first set of RSMA spreading codes and the second access pool includes a second set of RSMA spreading codes. The first access pool may be common access pool and the second access pool may be reserved access pool. Aspects of block 455 may be performed by communication management component 350 described with reference to FIG. 3.

At block 460, the method 450 may include generating a first broadcast message that includes the selected RSMA spreading code for the first IoE device in addition to information associated with uplink traffic periodicity of the first IoE device. Aspects of block 455 may also be performed by communication management component 350 described with reference to FIG. 3.

At block 465, the method 450 may include transmitting the first broadcast message from the first IoE device to at least one second IoE device in a discovery broadcast. Aspects of block 465 may be performed by transceiver 302 described with reference to FIG. 3.

At block 470, the method 450 may optionally include receiving, at a first IoE device, a second broadcast message from the at least one second IoE device. Aspects of block 470 may be performed by receiver 306 described with reference to FIG. 3.

At block 475, the method 450 may optionally include determining, based on the second broadcast message, that the at least one second IoE device has also selected the first RSMA spreading code overlapping the uplink traffic periodicity of the first IoE device. Aspects of block 475 may be performed by collision avoidance component 380 described with reference to FIG. 3.

At block 480, the method 450 may optionally include selecting, at a first IoE device, a second RSMA spreading code for the uplink periodic communication with a base station after predetermined number of consecutive failure. Aspects of block 480 may be performed by collision avoidance component 380 described with reference to FIG. 3.

Figure 5:
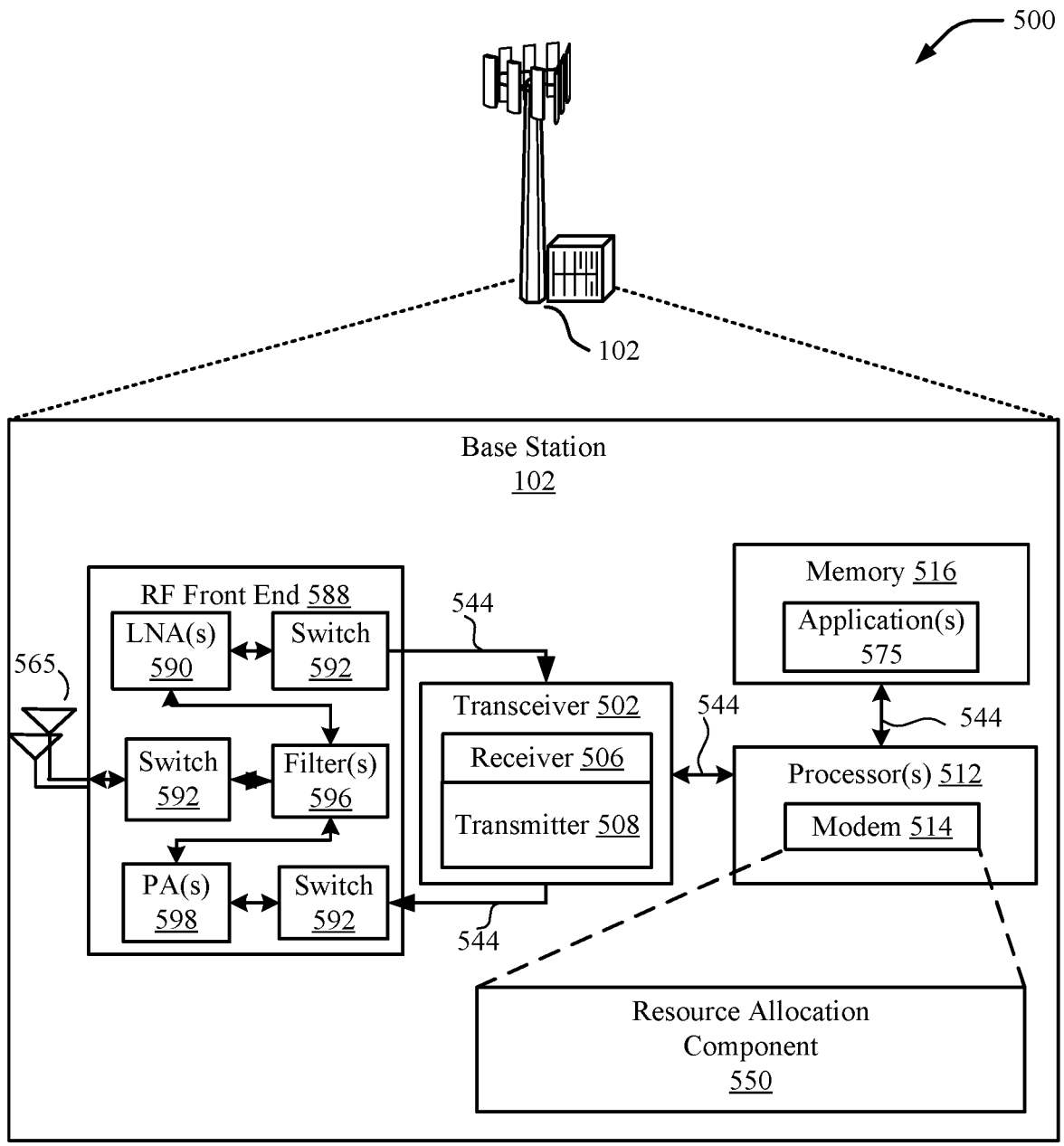
FIG. 5 illustrates an example of a schematic diagram of an aspect of an implementation of various components of a base station in accordance with various aspects of the present disclosure.

FIG. 5 illustrates a hardware components and subcomponents of a device that may be a base station 102 for implementing one or more methods (e.g., method 600) described herein in accordance with various aspects of the present disclosure. For example, one example of an implementation of the base station 102 may include a variety of components, some of which have already been described above, but including components such as one or more processors 512, memory 516 and transceiver 502 in communication via one or more buses 544, which may operate in conjunction with the resource allocation component 550 to perform functions described herein related to including one or more methods (e.g., 600) of the present disclosure.

In some examples, the resource allocation component 550 may receive a notification from an IoE device 104 of the traffic periodicity of the IoE device 104. In response, the resource allocation component 550 may assign a spreading code to one or more IoE devices 104 from a dedicated pool that is not utilized during the periodic access of the device by other IoE devices 104 in the network. Specifically, since the base station 102 may be informed of traffic periodicity of the other IoE devices 104 on the wireless network, the resource allocation component 350 may be better equipped to assign RSMA spreading codes to the IoE devices 104 such that no two IoE devices 104 may select the same RSMA spreading code during overlapping traffic periodicity (e.g., the time during which the IoE devices are likely to initiate uplink traffic). As such, by way of resource allocation component 550, the base station 102 may reserve the RSMA spreading code for a IoE device 104 for a time period, including the device access time and any additional margin (e.g., for timing offset, channel variation, or expected traffic variance) on a periodic basis.

The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 can include a modem 514 that uses one or more modem processors. The various functions related to capability management component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with capability management component 550 may be performed by transceiver 502.

The memory 516 may be configured to store data used herein and/or local versions of application(s) 575 or capability management component 550 and/or one or more of its subcomponents being executed by at least one processor 512. The memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining capability management component 550 and/or one or more of its subcomponents, and/or data associated therewith, when the UE 104 is operating at least one processor 512 to execute capability management component 550 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102 or wireless transmissions transmitted by UE 104. The RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 388. In an aspect, the transceiver 502 may be tuned to operate at specified frequencies such that transmitting device can communicate with, for example, one or more UEs 104 or one or more cells associated with one or more base stations 102. In an aspect, for example, the modem 514 can configure the transceiver 502 to operate at a specified frequency and power level based on the configuration of the transmitting device and the communication protocol used by the modem 514.

In an aspect, the modem 514 can be a multiband-multimode modem, which can process digital data and communicate with the transceiver 502 such that the digital data is sent and received using the transceiver 502. In an aspect, the modem 514 can be multiband and be configured to support multiple frequency bands for a specific communications protocol. In an aspect, the modem 514 can be multimode and be configured to support multiple operating networks and communications protocols. In an aspect, the modem 514 can control one or more components of transmitting device (e.g., RF front end 588, transceiver 502) to enable transmission and/or reception of signals from the network based on a specified modem configuration. In an aspect, the modem configuration can be based on the mode of the modem 514 and the frequency band in use. In another aspect, the modem configuration can be based on base station 104 configuration information associated with transmitting device as provided by the network during cell selection and/or cell reselection.

Figure 6:
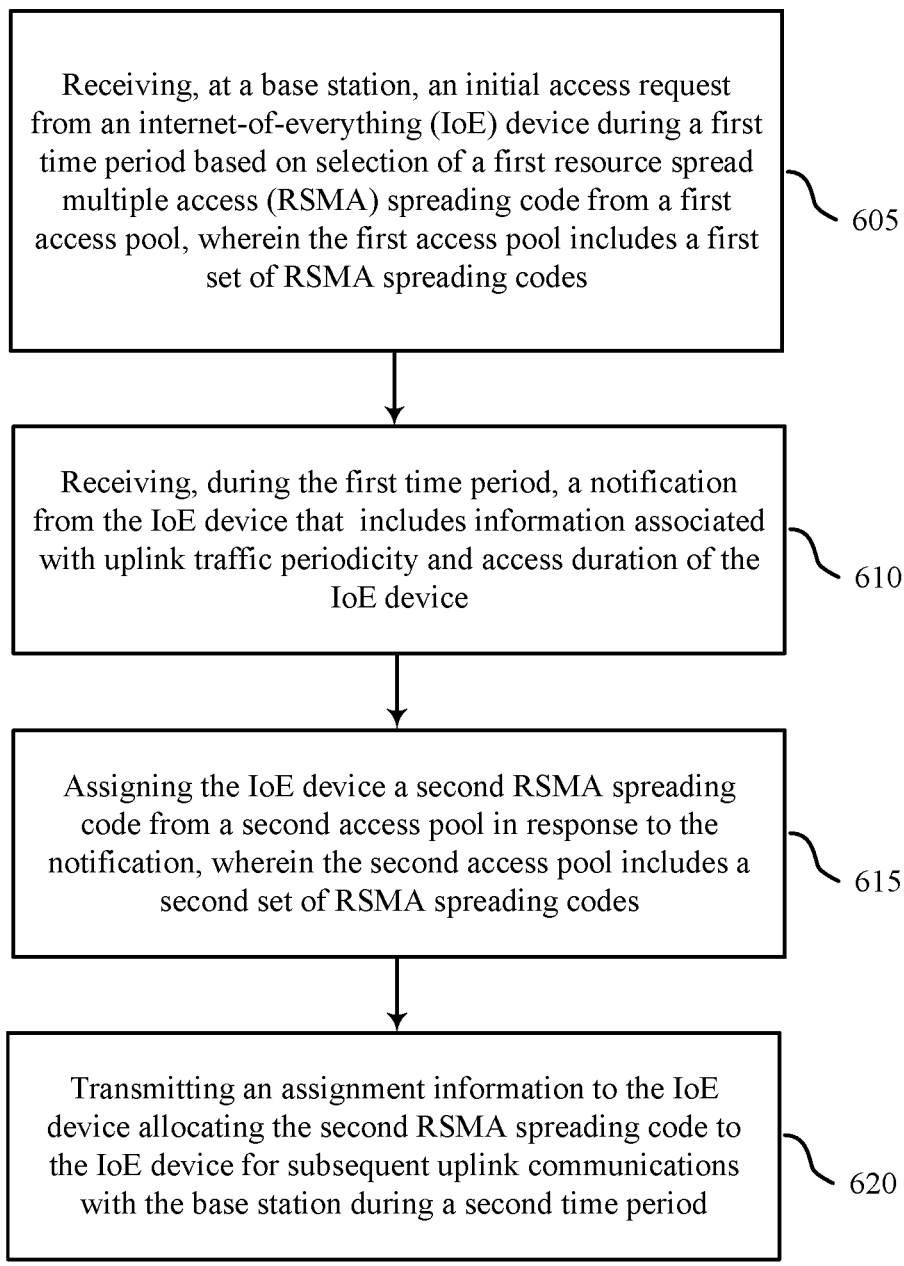
FIG. 6 illustrates an example of a method of wireless communication implemented by the base station in accordance with aspects of the present disclosure.

FIG. 6 is a flowchart of an example method 600 for wireless communications in accordance with aspects of the present disclosure. The method 600 may be performed using the base station 102. Although the method 600 is described below with respect to the elements of the base station 102, other components may be used to implement one or more of the steps described herein.

At block 605, the method 600 may include receiving, at a base station, an initial access request from an internet-of-everything (IoE) device during a first time period based on selection of a first resource spread multiple access (RSMA) spreading code from a first access pool, wherein the first access pool includes a first set of RSMA spreading codes.

Aspects of block 605 may be performed by receiver 506 described with reference to FIG. 5.

At block 610, the method 600 may include receiving, during the first time period, a notification from the IoE device that includes information associated with uplink traffic periodicity and access duration of the IoE device. Aspects of block 610 may also be performed by receiver 506 described with reference to FIG. 5.

At block 615, the method 600 may include assigning the IoE device a second RSMA spreading code from a second access pool in response to the notification, wherein the second access pool includes a second set of RSMA spreading codes. In some examples, assigning the second RSMA spreading code may include determining that the second RSMA spreading code is not utilized by any other IoE during periodic access duration of the IoE device. In some examples, the method 600 may also include reserving the second RSMA spreading code for a designated duration of time. In some examples, the designated duration of time includes at least one of device access time duration and delay margin, wherein the delay margin includes one or more of timing offset, channel variation, or expected traffic arrival variance on periodic basis. Aspects of block 615 may be performed by resource allocation component 550 described with reference to FIG. 5.

At block 620, the method 600 may include transmitting an assignment information to the IoE device allocating the second RSMA spreading code to the IoE device for subsequent uplink communications with the base station during a second time period. Aspects of block 620 may be performed by transceiver 502 described with reference to FIG. 5.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

Some Further Example Implementations

An example method for wireless communication, comprising: establishing, at an internet-of-everything (IoE) device, initial access with a base station during a first time period based on selection of a first resource spread multiple access (RSMA) spreading code from a first access pool, wherein the first access pool includes a first set of RSMA spreading codes; transmitting a notification to the base station during the initial access that includes information associated with uplink traffic periodicity and access duration of the IoE device; receiving, from the base station, an assignment of a second RSMA spreading code from a second access pool in response to the notification, wherein the second access pool includes a second set of RSMA spreading codes; and selecting the second RSMA spreading code for periodic uplink communication with the base station during a second time period.

The above example method, further comprising: transmitting an uplink traffic during the second time period based on selection of the second RSMA spreading code, wherein the second time period is associated with the uplink traffic periodicity of the IoE device.

Any of the above example methods, wherein the assignment of the second RSMA spreading code by the base station further comprises: reservation of the second RSMA spreading code for designated duration of time.

Any of the above example methods, wherein the designated duration of time includes at least one of device access time duration and delay margin, wherein the delay margin includes one or more of timing offset, channel variation, or expected traffic arrival variance on periodic basis.

An example method for wireless communication, comprising: selecting, at a first internet-of-everything (IoE) device, a first resource spread multiple access (RSMA) spreading code for uplink periodic communication with a base station; generating a first broadcast message that includes the selected RSMA spreading code for the first IoE device in addition to information associated with uplink traffic periodicity of the first IoE device; and transmitting the first broadcast message from the first IoE device to at least one second IoE device in a discovery broadcast.

The above example method, further comprising: receiving, at a first IoE device, a second broadcast message from the at least one second IoE device; determining, based on the second broadcast message, that the at least one second IoE device has also selected the first RSMA spreading code overlapping the uplink traffic periodicity of the first IoE device.

Any of the above example methods, further comprising: selecting, at a first IoE device, a second RSMA spreading code for the uplink periodic communication with a base station after predetermined number of consecutive failures.

Any of the above example methods, wherein the first RSMA spreading code is selected from one of a first access pool or a second access pool, wherein the first access pool includes a first set of RSMA spreading codes and the second access pool includes a second set of RSMA spreading codes.

An example apparatus for wireless communications, comprising: a memory configured to store instructions; a processor communicatively coupled with the memory, the processor configured to execute the instructions to: establish, at an internet-of-everything (IoE) device, initial access with a base station during a first time period based on selection of a first resource spread multiple access (RSMA) spreading code from a first access pool, wherein the first access pool includes a first set of RSMA spreading codes; transmit a notification to the base station during the initial access that includes information associated with uplink traffic periodicity and access duration of the IoE device; receive, from the base station, an assignment of a second RSMA spreading code from a second access pool in response to the notification, wherein the second access pool includes a second set of RSMA spreading codes; and select the second RSMA spreading code for periodic uplink communication with the base station during a second time period.

The above example apparatus, wherein the processor is further configured to execute the instructions to: transmit an uplink traffic during the second time period based on selection of the second RSMA spreading code, wherein the second time period is associated with the uplink traffic periodicity of the IoE device.

Any of the above example apparatus, wherein the assignment of the second RSMA spreading code by the base station further comprises: reservation of the second RSMA spreading code for designated duration of time.

Any of the above example apparatus, wherein the designated duration of time includes at least one of device access time duration and delay margin, wherein the delay margin includes one or more of timing offset, channel variation, or expected traffic arrival variance on periodic basis.

An example apparatus for wireless communications, comprising: a memory configured to store instructions; a processor communicatively coupled with the memory, the processor configured to execute the instructions to: select, at a first internet-of-everything (IoE) device, a first resource spread multiple access (RSMA) spreading code for uplink periodic communication with a base station; generate a first broadcast message that includes the selected RSMA spreading code for the first IoE device in addition to information associated with uplink traffic periodicity of the first IoE device; and transmit the first broadcast message from the first IoE device to at least one second IoE device in a discovery broadcast.

The above example apparatus, wherein the processor is further configured to: receive, at a first IoE device, a second broadcast message from the at least one second IoE device; and determine, based on the second broadcast message, that the at least one second IoE device has also selected the first RSMA spreading code overlapping the uplink traffic periodicity of the first IoE device.

Any of the above example apparatus, wherein the processor is further configured to: select, at a first IoE device, a second RSMA spreading code for the uplink periodic communication with a base station after predetermined number of consecutive failures.

Any of the above example apparatus, wherein the first RSMA spreading code is selected from one of a first access pool or a second access pool, wherein the first access pool includes a first set of RSMA spreading codes and the second access pool includes a second set of RSMA spreading codes.

An example apparatus for wireless communication, comprising: means for establishing, at an internet-of-everything (IoE) device, initial access with a base station during a first time period based on selection of a first resource spread multiple access (RSMA) spreading code from a first access pool, wherein the first access pool includes a first set of RSMA spreading codes; means for transmitting a notification to the base station during the initial access that includes information associated with uplink traffic periodicity and access duration of the IoE device; means for receiving, from the base station, an assignment of a second RSMA spreading code from a second access pool in response to the notification, wherein the second access pool includes a second set of RSMA spreading codes; and means for selecting the second RSMA spreading code for periodic uplink communication with the base station during a second time period.

The above example apparatus, further comprising: means for transmitting an uplink traffic during the second time period based on selection of the second RSMA spreading code, wherein the second time period is associated with the uplink traffic periodicity of the IoE device.

Any of the above example apparatus, wherein the assignment of the second RSMA spreading code by the base station further comprises: reservation of the second RSMA spreading code for designated duration of time.

Any of the above example apparatus, wherein the designated duration of time includes at least one of device access time duration and delay margin, wherein the delay margin includes one or more of timing offset, channel variation, or expected traffic arrival variance on periodic basis.

An example apparatus for wireless communication, comprising: means for selecting, at a first internet-of-everything (IoE) device, a first resource spread multiple access (RSMA) spreading code for uplink periodic communication with a base station; means for generating a first broadcast message that includes the selected RSMA spreading code for the first IoE device in addition to information associated with uplink traffic periodicity of the first IoE device; and means for transmitting the first broadcast message from the first IoE device to at least one second IoE device in a discovery broadcast.

The above example apparatus, further comprising: means for receiving, at a first IoE device, a second broadcast message from the at least one second IoE device; means for determining, based on the second broadcast message, that the at least one second IoE device has also selected the first RSMA spreading code overlapping the uplink traffic periodicity of the first IoE device.

Any of the above example apparatus, further comprising: means for selecting, at a first IoE device, a second RSMA spreading code for the uplink periodic communication with a base station after predetermined number of consecutive failures.

Any of the above example apparatus, wherein the first RSMA spreading code is selected from one of a first access pool or a second access pool, wherein the first access pool includes a first set of RSMA spreading codes and the second access pool includes a second set of RSMA spreading codes.

An example non-transitory computer readable medium for wireless communication, comprising code for: establishing, at an internet-of-everything (IoE) device, initial access with a base station during a first time period based on selection of a first resource spread multiple access (RSMA) spreading code from a first access pool, wherein the first access pool includes a first set of RSMA spreading codes; transmitting a notification to the base station during the initial access that includes information associated with uplink traffic periodicity and access duration of the IoE device; receiving, from the base station, an assignment of a second RSMA spreading code from a second access pool in response to the notification, wherein the second access pool includes a second set of RSMA spreading codes; and selecting the second RSMA spreading code for periodic uplink communication with the base station during a second time period.

The above example computer readable medium, further comprising code for: transmitting an uplink traffic during the second time period based on selection of the second RSMA spreading code, wherein the second time period is associated with the uplink traffic periodicity of the IoE device.

Any of the above example computer readable medium, wherein the assignment of the second RSMA spreading code by the base station further comprises: reservation of the second RSMA spreading code for designated duration of time.

Any of the above example computer readable medium, wherein the designated duration of time includes at least one of device access time duration and delay margin, wherein the delay margin includes one or more of timing offset, channel variation, or expected traffic arrival variance on periodic basis.

An example computer readable medium for wireless communication, comprising code for: selecting, at a first internet-of-everything (IoE) device, a first resource spread multiple access (RSMA) spreading code for uplink periodic communication with a base station; generating a first broadcast message that includes the selected RSMA spreading code for the first IoE device in addition to information associated with uplink traffic periodicity of the first IoE device; and transmitting the first broadcast message from the first IoE device to at least one second IoE device in a discovery broadcast.

The above example computer readable medium, further comprising code for: receiving, at a first IoE device, a second broadcast message from the at least one second IoE device; determining, based on the second broadcast message, that the at least one second IoE device has also selected the first RSMA spreading code overlapping the uplink traffic periodicity of the first IoE device.

Any of the above example computer readable medium, further comprising code for: selecting, at a first IoE device, a second RSMA spreading code for the uplink periodic communication with a base station after predetermined number of consecutive failures.

Any of the above example computer readable medium, wherein the first RSMA spreading code is selected from one of a first access pool or a second access pool, wherein the first access pool includes a first set of RSMA spreading codes and the second access pool includes a second set of RSMA spreading codes.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   establishing, at an internet-of-everything (IoE) device, initial access with a base station during a first time period based on selection of a first resource spread multiple access (RSMA) spreading code from a first access pool, wherein the first access pool includes a first set of RSMA spreading codes;
   transmitting a notification to the base station during the initial access that includes information associated with uplink traffic periodicity and access duration of the IoE device;
   receiving, from the base station, an assignment of a second RSMA spreading code from a second access pool in response to the notification, wherein the second access pool includes a second set of RSMA spreading codes; and
   selecting the second RSMA spreading code for periodic uplink communication with the base station during a second time period, wherein the second time period is associated with the uplink traffic periodicity of the IoE device.

2. The method of claim 1, further comprising:
   transmitting an uplink traffic during the second time period based on selection of the second RSMA spreading code.

3. The method of claim 1, wherein the assignment of the second RSMA spreading code by the base station further comprises:
   reservation of the second RSMA spreading code for designated duration of time.

4. The method of claim 3, wherein the designated duration of time includes at least one of device access time duration and delay margin, wherein the delay margin includes one or more of timing offset, channel variation, or expected traffic arrival variance on periodic basis.

5. An apparatus for wireless communications, comprising:
   a memory configured to store instructions;
   a processor communicatively coupled with the memory, the processor configured to execute the instructions to:
      establish, at an internet-of-everything (IoE) device, initial access with a base station during a first time period based on selection of a first resource spread multiple access (RSMA) spreading code from a first access pool, wherein the first access pool includes a first set of RSMA spreading codes;
      transmit a notification to the base station during the initial access that includes information associated with uplink traffic periodicity and access duration of the IoE device;
      receive, from the base station, an assignment of a second RSMA spreading code from a second access pool in response to the notification, wherein the second access pool includes a second set of RSMA spreading codes; and
      select the second RSMA spreading code for periodic uplink communication with the base station during a second time period, wherein the second time period is associated with the uplink traffic periodicity of the IoE device.

6. The apparatus of claim 5, wherein the processor is further configured to execute the instructions to:
   transmit an uplink traffic during the second time period based on selection of the second RSMA spreading code.

7. The apparatus of claim 5, wherein the assignment of the second RSMA spreading code by the base station further comprises:
   reservation of the second RSMA spreading code for designated duration of time.

8. The apparatus of claim 7, wherein the designated duration of time includes at least one of device access time duration and delay margin, wherein the delay margin includes one or more of timing offset, channel variation, or expected traffic arrival variance on periodic basis.

9. An apparatus for wireless communications, comprising:
   means for establishing initial access with a base station during a first time period based on selection of a first resource spread multiple access (RSMA) spreading code from a first access pool, wherein the first access pool includes a first set of RSMA spreading codes;
   means for transmitting a notification to the base station during the initial access that includes information associated with uplink traffic periodicity and access duration of the IoE device;
   means for receiving, from the base station, an assignment of a second RSMA spreading code from a second access pool in response to the notification, wherein the second access pool includes a second set of RSMA spreading codes; and
   means for selecting the second RSMA spreading code for periodic uplink communication with the base station during a second time period, wherein the second time period is associated with the uplink traffic periodicity of the IoE device.

10. The apparatus of claim 9, further comprising:
    means transmitting an uplink traffic during the second time period based on selection of the second RSMA spreading code.

11. The apparatus of claim 9, wherein the assignment of the second RSMA spreading code by the base station includes reservation of the second RSMA spreading code for designated duration of time.

12. The apparatus of claim 11, wherein the designated duration of time includes at least one of device access time duration and delay margin, wherein the delay margin includes one or more of timing offset, channel variation, or expected traffic arrival variance on periodic basis.

13. A non-transitory computer-readable medium containing instructions stored thereon, which, when executed by an apparatus, cause the apparatus to:
    establish, at an internet-of-everything (IoE) device, initial access with a base station during a first time period based on selection of a first resource spread multiple access (RSMA) spreading code from a first access pool, wherein the first access pool includes a first set of RSMA spreading codes;
    transmit a notification to the base station during the initial access that includes information associated with uplink traffic periodicity and access duration of the IoE device;

receive, from the base station, an assignment of a second RSMA spreading code from a second access pool in response to the notification, wherein the second access pool includes a second set of RSMA spreading codes; and select the second RSMA spreading code for periodic uplink communication with the base station during a second time period, wherein the second time period is associated with the uplink traffic periodicity of the IoE device.

14. The non-transitory computer-readable medium of claim 13, the instructions further cause the apparatus to:
transmit an uplink traffic during the second time period based on selection of the second RSMA spreading code.

15. The non-transitory computer-readable medium of claim 13, wherein the assignment of the second RSMA spreading code by the base station further includes reservation of the second RSMA spreading code for designated duration of time.

16. The non-transitory computer-readable medium of claim 15, wherein the designated duration of time includes at least one of device access time duration and delay margin, wherein the delay margin includes one or more of timing offset, channel variation, or expected traffic arrival variance on periodic basis.

\* \* \* \* \*